(12) United States Patent
Beringer

(10) Patent No.: US 7,219,107 B2
(45) Date of Patent: May 15, 2007

(54) COLLABORATIVE INFORMATION SPACES

(75) Inventor: Joerg Beringer, Frankfurt (DE)

(73) Assignee: SAP AG, Walldorf (DE)

( * ) Notice: Subject to any disclaimer, the term of this patent is extended or adjusted under 35 U.S.C. 154(b) by 533 days.

(21) Appl. No.: 10/663,343

(22) Filed: Sep. 15, 2003

(65) Prior Publication Data

US 2004/0122696 A1    Jun. 24, 2004

Related U.S. Application Data

(60) Provisional application No. 60/436,219, filed on Dec. 23, 2002, provisional application No. 60/471,228, filed on May 16, 2003, provisional application No. 60/471,375, filed on May 16, 2003.

(51) Int. Cl.
   *G06F 7/00*  (2006.01)
   *G06F 17/00* (2006.01)
   *G06F 17/30* (2006.01)

(52) U.S. Cl. .................. 707/104.1; 707/1; 707/3

(58) Field of Classification Search ............ 707/102, 707/103 R, 104.1, 1, 3
   See application file for complete search history.

(56) References Cited

U.S. PATENT DOCUMENTS

| | | | |
|---|---|---|---|
| 6,233,600 B1* | 5/2001 | Salas et al. ............. | 709/201 |
| 6,484,149 B1* | 11/2002 | Jammes et al. .......... | 705/26 |
| 2002/0049749 A1* | 4/2002 | Helgeson et al. ........ | 707/3 |
| 2003/0023677 A1* | 1/2003 | Morison et al. ......... | 709/203 |
| 2004/0088315 A1* | 5/2004 | Elder et al. ............ | 707/102 |

OTHER PUBLICATIONS

Neches et al. "Collaborative Information Space Analysis Tools" D-Lib Magazine, Oct. 1998.*
Cavalcanti et al., "A Logic Based Approach for Automatic Synthesis and Maintenance of Web Sites" SEKE 2002, Jul. 15-19, 2002, ACM.*
Weinberger et al., "Computers in Radiology: MyPACS.net: A Web-Based Teaching File Authoring Tool", The American Journal of Roentgenology, Issue 179, pp. 579-583, Sep. 2002.*
U.S. Appl. No. 10/628,824, filed on Jul. 28, 2003, entitled "Personal Procedure Agent".
U.S. Appl. No. 10/655,783, filed on Sep. 5, 2003, entitled "Community Builder".

(Continued)

*Primary Examiner*—Jeffrey Gaffin
*Assistant Examiner*—Michael J. Hicks
(74) *Attorney, Agent, or Firm*—Finnegan, Henderson, Farabow, Garrett & Dunner LLP

(57) ABSTRACT

A method includes defining collaborative information spaces (CISs) on a corporate intranet using semantic definitions that reflect how people work together. A classification scheme allows network spaces (e.g., intranet spaces) to be defined, e.g., defining resources and/or information associated with tasks and people. The classification scheme may also be used to define standard collaborative entities that should be supported within an enterprise. The CIS(s) and/or collaborative entities may have associated privacy levels to control access to information and resources of the CIS. The classification scheme allows a user, or group of users, to define public and private information spaces. For example, a user may define public information on a web-page that defines the users skills and assigned tasks. The user may have another set of private information that is accessible only to other members of others having a common task.

17 Claims, 3 Drawing Sheets

OTHER PUBLICATIONS

U.S. Appl. No. 10/657,748, filed on Sep. 8, 2003, entitled "Guided Procedure Framework".

U.S. Appl. No. 10/658,584, filed on Sep. 8, 2003, entitled "Resource Finder Tool".

U.S. Appl. No. 10/663,365, filed on Sep. 15, 2003, entitled "Resource Templates".

U.S. Appl. No. 10/663,372, filed on Sep. 15, 2003, entitled "Compiling User Profile Information From Multiple Sources".

U.S. Appl. No. 10/663,382, filed on Sep. 15, 2003, entitled "Control Center Pages".

\* cited by examiner

COLLABORATIVE INFORMATION SPACES

CLAIM OF PRIORITY

This application claims priority to U.S. Provisional Patent Application Ser. No. 60/471,228, filed on May 16, 2003.

This application claims priority to U.S. Provisional Patent Application Ser. No. 60/471,375, filed on May 16, 2003.

This application claims priority to U.S. Provisional Patent Application Ser. No. 60/436,219, filed on Dec. 23, 2002.

BACKGROUND

The following description relates to enterprise management systems and techniques. In particular, the following description relates to applications that allow a user to define and find relevant data and resources.

Recent developments in enterprise management systems have attempted to integrate multiple legacy systems, typically found in existing heterogeneous information technology (IT) environments, into a common enterprise management solution. Such integration technologies frequently fail to deliver a fully integrated platform that also provides sufficient flexibility to adjust to rapidly changing enterprise environments.

Knowledge sharing is considered a relatively important tool for a user to achieve a high level productivity. Many users of conventional business systems may find it difficult to access information and/or tools required to perform a task. Many types of activities may involve a relatively large number of tasks to complete, sometimes in a specific sequence and/or combination. Regardless of whether the tasks need to be completed regularly (e.g., daily, weekly) or just occasionally, a user of a database system may need to access several executable tools (e.g., executable applications) and retrieve information from various sources (e.g., data stored on a computer, or computer network). In a conventional work system, many tools and/or processes may have only one owner.

SUMMARY

The present application describes systems and techniques relating to classifying information that may be shared among employees of an enterprise. The present inventors recognized that conventional corporate information repositories do not provide an information architecture that is aligned with the collaborative work structures as they exist in an enterprise. They also fail to reflect the notion of trust levels people have in information depending on the author's reputation and depending on the degree of anonymity. The classification principles and the linking of information to the collaborative structures enable a user to quickly find relevant information by directly navigating from people to information and by searching within people-related information structures.

In one aspect, a method includes classifying a set of information associated with a collaborative entity according to its main purpose, assigning it to the appropriate web-page template depending on purpose, and relating the web-page to this collaborative entity.

Details of one or more implementations are set forth in the accompanying drawings and the description below. Other features and advantages may be apparent from the description and drawings, and from the claims.

DRAWING DESCRIPTIONS

DETAILED DESCRIPTION

There is a tremendous amount of information available to users of an enterprise system (e.g., employees of a business entity) via the Internet, Intranets, Databases, etc. The amount of available information makes it difficult for such users to obtain information considered relevant.

Usually, there is a disconnect between the information architecture of a corporate Intranet, which is topic based, and the evolving structure of shared folders, which is collaboration driven. This makes it difficult to relate people to information and information to people.

Public information within an enterprise is of a different quality. Information that is associated with a recognized expert is trusted more than information that is residing on anonymous intranet servers.

Figure 1:
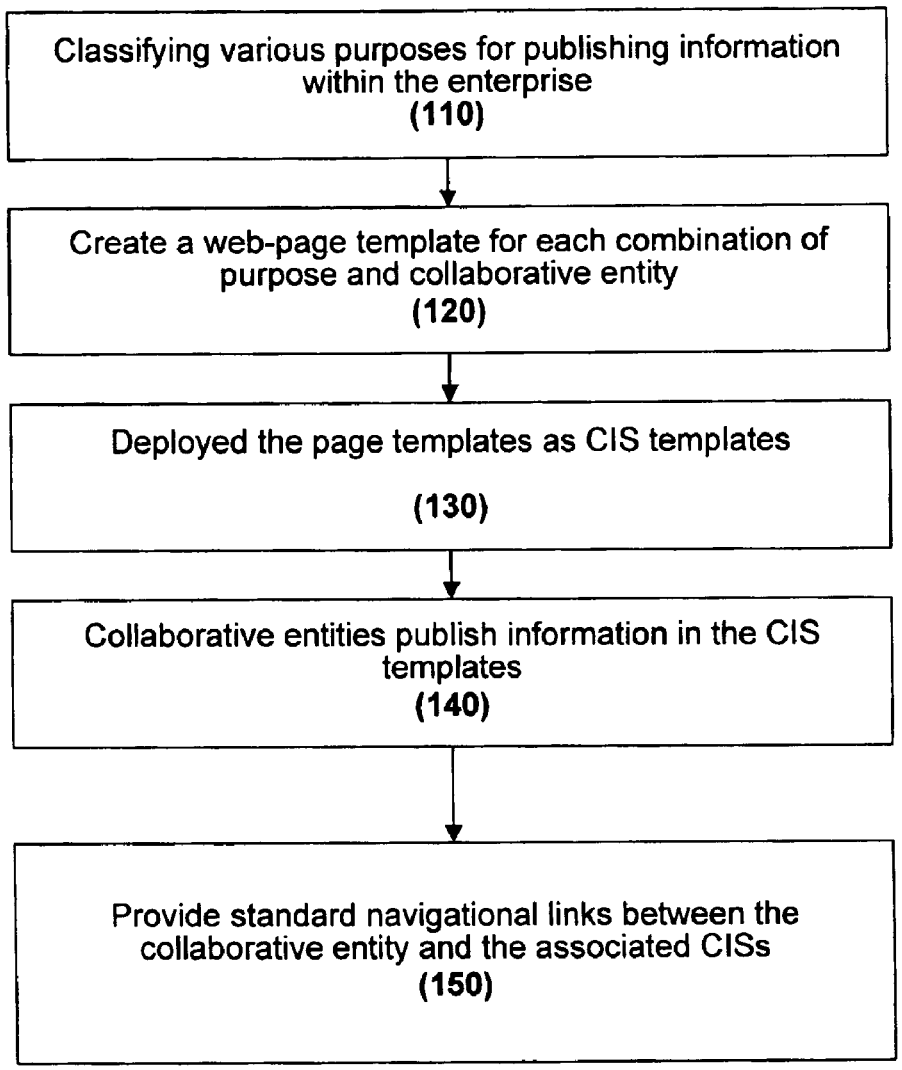
FIG. 1 is a flowchart of a classification process.

FIG. 1 shows a classification process 100 that may be used to classify types of collaborative information space (CIS) that correspond to information related to a collaborative entity. "Collaborative entity" refers to individuals or groups that represent informal or formal teams, organizational units, or communities. The classification process 100 generates a portfolio of CIS templates that allow one or more members of the collaborative entity to publish information using pre-defined web-page templates.

In one implementation, process 100 is used on a computer network, such as a corporate intranet. For example, a CIS template may be represented as a page layout and standard information elements. An individual web-page containing information about one particular collaborative entity is created by a member of the entity and made available to the corresponding audience using pre-defined links. Representing information in form of CIS templates and links as viewable web-pages allows the CIS to appear in a consistent and predictable manner to each member of the corporate intranet.

The process 100 includes classifying various purposes for publishing information within an enterprise (block 110). This classification may be performed for each generic collaborative entity, such as person, team, department, project, initiative, and community. A web-page template is then created for each combination of purpose and collaborative entity (block 120). The page templates are deployed as CIS templates to ensure a consistent design language and high quality (block 130). The corresponding collaborative entities may then publish information in the CIS templates (block 140). For quick access to information spaces, standard navigational links may be provided within the software system between the collaborative entity and the associated CISs (block 150).

Search tools with user-selectable search ranges may be provided to leverage the classification of purposes and collaborative entities. The content of a CISs may be used to implicit profiling of the associated collaborative entities.

Figure 2:
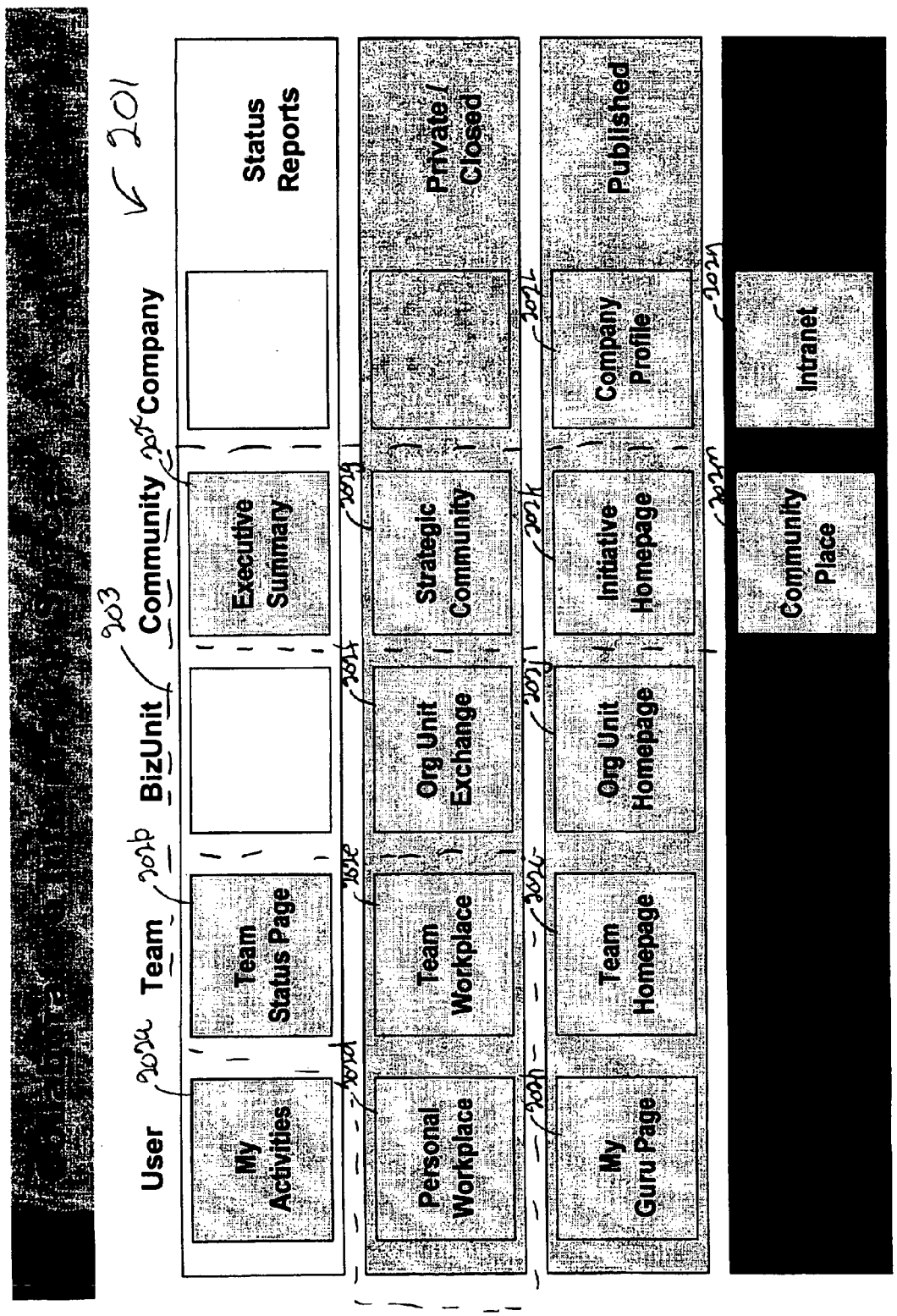
FIG. 2 is a chart showing different purposes and collaborative entities together with the resulting combinations of collaborative information spaces.

FIG. 2 is an exemplary chart 201 showing information files (e.g., web-pages) that may be candidates for a CIS. In this example, web-pages 202a–202n are stored on a network, in which a group of web-pages 203 (e.g., including 202b–202e, 202g, 202k and 202m) are designated as CIS web-pages. The web-pages included in group 203 are accessible only to members of a community 205 (e.g., a collaborative entity).

In some implementations of process 100, only a sub-set of all the information available on a web-page is accessible to members of the CIS. For example, a web-page may include a sub-set of information included in a private space that is accessible only to the web-page owner(s) and another sub-set of information that is defined as part of the CIS. The CIS(s), therefore, may be represented by web-pages, either as individual web-pages, or as groups of web-pages. The groups of web-pages may be displayed simultaneously on a graphical display of a user device, for example.

Collaborative entities may be defined by membership rules, for example, a collaborative entity may include members having a common task or job, having a common activity, or a similar need to access a common set of information in a CIS.

A collaborative entity may provide some information through CIS that are public, for example, an 'about me' page that describes the purpose of the entity or membership of the entity. However, the 'about me' page may prohibit access to non-members of the information included in the CIS. Therefore, in some implementations, process 100 allows for classification of web-page(s) as either personal, private, as part of a CIS, or a combination. A member of a collaborative entity may then use web-page icons that define a CIS to perform a search for people, information and/or resources. In some implementations, hyperlinks between a person or a collaborative entity and the related CIS, or between several CISs associated with the same entity, allow a user to "navigate" to a CIS web-page or from one CIS web-page to another. For example, using a searching application (e.g., a people finder application) a user may locate a person's 'about me' web-page that lists a CIS associated with that person.

Use of process 100 to define CIS(s) allows for a large amount of information required to perform a collaborative task to be classified. The use of process 100 may allow a user to readily view the CIS information as web-pages that contain the CIS information.

In some implementations, the classification scheme associated with process 100 may be used on an intranet. The intranet provides users access to a variety of applications (functionalities) that allow for maintenance, location, refinement, propagation, subscription and navigation of information. The applications may include a finder application that allows the establishment of user profiles, defining various data sources for these profiles, filling them through implicit or explicit profiling, finding knowledge resources such as employees or documents depending on skills or different attributes. The functionalities may also include a knowledge maintenance component that enables users to change, publish and share in-formation on how to find human experts and document-based knowledge. The functionalities may also include a targeted information propagation component that enables a business entity to target crucial information and applications to sharply defined groups of knowledge workers. The functionalities may also include registration Lists that may be used to manage ordered lists of users and are associated with an event or topic. The functionalities may also include Voting Integration that allows participant to express a choice in a decision process by casting a vote. The functionalities may also include a "MyDay" page that provides participants with time-based information to accomplish their daily work. For example, the MyDay page may be used to display relevant, collected information (e.g. Calendar, Important Messages, Tip of the day, Upcoming Events) and displayed on a single page ('MyDay').

Some implementations provide users various functionalities such as functional task automation, streamlining and coordination of processes involving different applications and people, collaboration support, and flexibility to incorporate necessary ad-hoc changes. Ad-hoc changes to any process may be carried out by any end-user without leaving the CIS. Some implementations allow defining processes and process contexts that enable the set up and seamless execution of collaborative business processes integrated with a heterogeneous IT environment.

A Finder application allows setting up profiles of users (e.g., skills or employees) and locating those profiles. In some implementations, a selection of found profiles is saved in a collection that may then serve as a starting point for further handling (e.g. contact, targeted information push or collaborative work).

A finder application allows a user to locate appropriate people and/or resources and solves the problem of filtering through the great variety and volume of information available to a user. Moreover, use of the finder and/or the resource templates ensures that the people and/or resources located by the user are relevant to the user's needs.

In an embodiment, a role-based productivity suite (PS) includes a set of tools (e.g., executable applications that may be used to access a database) that allow a group of participants to access a common set of information and tools to perform a collaborative project. The PS allows for each participant to have one or more assigned roles, and based on the assigned roles, be able to access information and tools considered most relevant to completing a task associated with the role. For example, a manager may use the PS to access a high-level view of operations to develop strategies, monitor projects, and manage corporate training, commissions, and benefits. Field service managers may use the PS to check service orders, organize work schedules, and manage requisitions. Customer service representatives may use the PS for access to shipment history, to review statistics, and to submit vacation requests. Users throughout a business may use PS to manage their own work environment while all managers may use the PS to more effectively manage their teams. Combining information and processes leads to better insight, faster decision making, and a more rapid execution of projects, thereby increasing productivity. The PS may further leverage existing resources and better align users with the company's ultimate business goals. The PS may also define default CISs for each role that reflect common work practice and collaborative needs.

Users of conventional knowledge sharing systems who need to send ("push") information to other users typically are not able to properly target the relevant group of users (e.g., employees). The result is a less productive user and a lower quality of work due to a lack of knowledge. Conventional knowledge sharing systems do not allow for a comprehensive solution for the location of expertise, collaboration with other users and/or employees, or the pushing of information to a targeted set of users. Embodiments of the PS system include one or more applications that allow effective knowledge sharing by determining and creating user profiles, finding documents and/or users based on the user profiles, and contacting and/or pushing information to allow collaborative work. Embodiments of the PS system may includes an application that determines and creates a user profile for each user of the PS system. The user profile may include, for example, a skill set associated with a user. The profile may also be established manually. Or, the user profile may be determined and created through explicit and/or implicit profiling. Explicit profiling uses structured data sources like human resource data, and implicit profiling parses unstructured data, such as e-mail files or a CIS, to determine a user profile. In all cases the employee owns his profile and decides which parts to make publicly available.

The PS may include an application for searching, for expertise from a set of user profiles and/or documents defined by a set of skills and/or attributes. Thereafter, users found by the expertise search may be contacted via email, telephone, etc., to exchange knowledge. The search results viewer may also allow the navigation between users and the their associated CISs.

In an embodiment, PS includes a finder application that includes a database of context data for users of a business entity. The database of context data may be derived from implicit or explicit profiling of users and/or data entered from another source (such as a legacy system or database of prior information related to user activity). In an embodiment that uses CISs, the links to CIS can be part of the profile database.

Implicit profiling refers to the determination of data that may be of interest to an expert finder system, and may be determined, for example, by parsing data entries, files, and/or documents. In an embodiment that uses CISs, the content of CIS web-pages may be used for implicit profiling of a person or a collaborative entity.

The term "collection" refers to a collection (e.g., a list) of resources (e.g., objects) that may be defined by a user of the finder system. For example, the collection may be created when a user saves a list or part of a list. In an embodiment, a user may also combined results from multiple searches in one collection. For example, collections may be published in a CIS that is designed to be a knowledge resource for other users.

The term "Explicit Profiling" refers to the act of manually maintaining profile information in a system. For example, a user can manually enter keywords describing the content of a CIS.

The term "Implicit Profiling" refers to the system-supported generation of profiling data, For example parsing of an unstructured data sources contained in a CIS.

Figure 3:
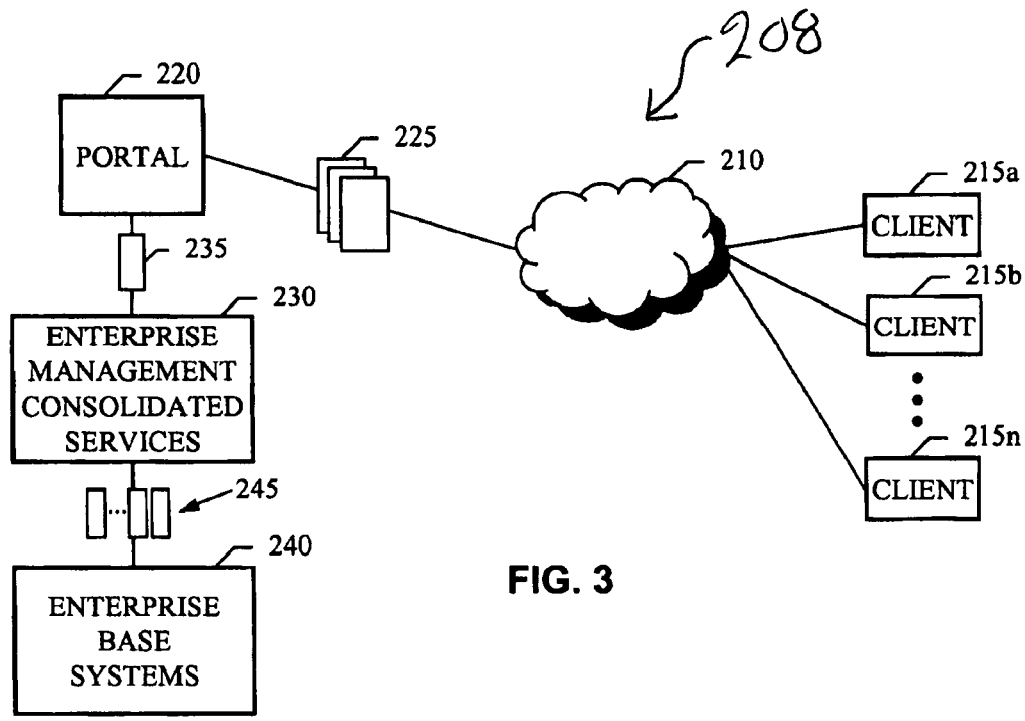
FIG. 3 is a block diagram illustrating an example of an integrated enterprise management system.

FIG. 3 is a block diagram illustrating an example integrated enterprise management system 208. Multiple clients 215a–215n may access data over a network 210 through a portal 220. The network 210 can be any communication network linking machines capable of communicating using one or more networking protocols, e.g., a local area network (LAN), a wide area network (WAN), an enterprise network, a virtual private network (VPN), and/or the Internet. The clients 215a–215n can be any machines or processes capable of communicating over the network 210. The clients 215a–215n may be implemented as Web Browsers and optionally can be communicatively coupled with the network 210 through a proxy server (not shown).

Portal 220 provides a common interface to program management services. The portal 220 receives requests from the clients 215a–215n and generates information views 225 (e.g., Web pages) in response. The portal 220 may implement a user role-based system to personalize the common interface and the information views 225 for a user of a client 215a–215n. A user can have one or more associated roles that allow personalized tailoring of a presented interface through the generated information views 225.

The portal 220 communicates with an enterprise management system 230 that consolidates multiple application services. The portal 220 may receive data 235 from the enterprise management system 230 for use in fulfilling the requests from the clients 215a–215n. The enterprise management system 230 may provide integrated application services to manage business objects and processes in a business enterprise. The business objects and processes can be resources (e.g., human resources), development projects, business programs, inventories, clients, accounts, business products, and/or business services.

The enterprise management system 230 communicates with enterprise base systems 240 to obtain multiple types of data 245. The enterprise base systems 240 may include various existing application services, such as human resource management systems, customer relationship management systems, financial management systems, project management systems, knowledge management systems, business warehouse systems, time management systems, and electronic file and/or mail systems. The enterprise base systems 240 also may include an integration tool, such as the eXchange Infrastructure provided by SAP, that provides another level of integration among base systems. The enterprise management system 230 can consolidate and integrate the data and functionality of such systems into a single enterprise management tool.

This enterprise management tool can include systems and techniques to facilitate creation of new applications within the enterprise management system 230. These new applications, referred to as cross-functional or composite applications, can readily draw on the resources of the enterprise base systems 240 to cross over traditional enterprise application boundaries and handle new business scenarios in a flexible and dynamic manner, allowing rapid and continuous innovation in business process management. A virtual business cycle can be created using such cross-functional applications, where executive-level business strategy can feed management-level operational planning, which can feed employee-level execution, which can feed management-level evaluation, which can feed executive-level enterprise strategy. The information generated at each of these stages in the enterprise management cycle can be readily consolidated and presented by the enterprise management system 230 using customized cross-functional applications. The stages can provide and consume determined services that can be integrated across multiple disparate platforms.

The portal 220, enterprise management system 230 and enterprise base systems 240 may reside in one or more programmable machines, which can communicate over a network or one or more communication busses. For example, the base systems 240 may reside in multiple servers connected to an enterprise network, and the portal 220 and the enterprise management system 230 may reside in a server connected to a public network. Thus, the system can include customized, web-based, cross-functional applications, and a user of the system can access and manage enterprise programs and resources using these customized web-based, cross-functional applications from anywhere that access to a public network is available.

Figure 4:
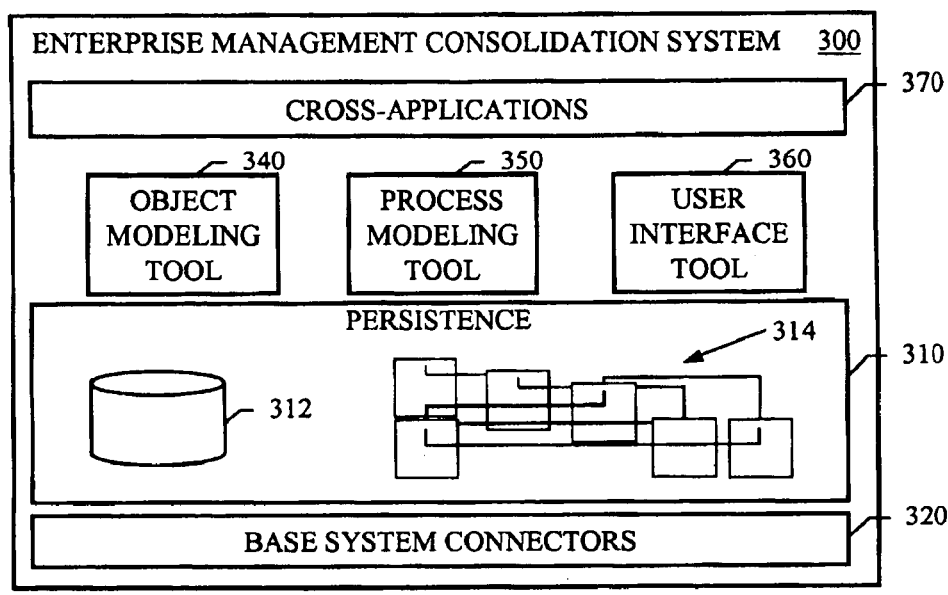
FIG. 4 is a block diagram illustrating components of an example enterprise management consolidation system.

FIG. 4 is a block diagram illustrating components of an example enterprise management consolidation system 300. The system 300 can include a persistence layer 310 and one or more base system connectors 320. The base system connectors 320 enable data exchange and integration with base systems. The base system connectors 320 can include a BC (Enterprise Connector) interface, an ICM/ICF (Internet Communication Manager/Internet Communication Framework) interface, an Encapsulated PostScript® (EPS) interface, or other interfaces that provide Remote Function Call (RFC) capability.

The persistence layer 310 provides the enterprise management consolidation system 300 with its own database 312 and data object model 314. The database 312 and the object model 314 provide a consolidated knowledge base to support multiple enterprise management functions, including functions created as cross-applications 370. Active communication between the persistence layer 310 and the base systems can provide a tight linkage between real-time operational data from multiple base systems and an integrated enterprise analysis tool to allow strategic enterprise management and planning.

The data object model 314 can represent a subset of data objects managed by the base systems. Not all of the data aspects tracked in the base systems need to be recorded in the data object model 314. The data object model 314 may have defined relationships with data objects stored in the base systems, for example, certain objects in the data object model 314 may have read-only or read-write relationships with corresponding data objects in the base systems. These types of defined relationships can be enforced through the communication system built between the persistence layer 310 and the base systems. Thus, the persistence layer 310 may be used to effectively decouple application development from the underlying base systems.

The cross-functional applications 370, which take advantage of this decoupling from backend systems to drive business processes across different platforms, technologies, and organizations, can be created using a set of tools that enable efficient development of cross-functional applications 370. The cross-functional applications 370 may support semi-structured processes, aggregate and contextualize information, handle event-driven and knowledge-based scenarios, and support a high degree of collaboration in teams, including driving collaboration and transactions. The set of tools enable efficient development of the cross-functional applications 370 by providing application patterns that support model-driven composition of applications in a service-oriented architecture.

An object modeling tool 340 enables creation of new business objects in the persistency layer 310 by providing a mechanism to extend the data object model 314 dynamically according to the needs of an enterprise. A process modeling tool 350 enables creation of new business workflow and ad hoc collaborative workflow. A user interface (UI) tool 360 provides UI patterns that can be used to link new objects and workflow together and generate standardized views into results generated by the cross-functional applications 370. The object modeling tool 340, the process modeling tool 350 and the UI tool 360 thus can be used to build the components of cross-applications 370 to implement new enterprise management functions without requiring detailed coding activity.

The process modeling tool 350 can include guided procedure templates with pre-configured work procedures that reflect best practices of achieving a work objective that is part of a larger cross-functional application scenario. Such a work procedure can include contributions from several people, creation of multiple deliverables, and milestones/phases. Moreover, whenever an instantiated business object or work procedure has lifetime and status, the progress and status of the object or work procedure can be made trackable by the process owner or by involved contributors using a dashboard that displays highly aggregated data.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Other embodiments not described herein are also within the scope of the following claims.

What is claimed is:

1. A method for publishing information associated with a collaborative entity within an enterprise, the method comprising:
   identifying at least one purpose for publishing information within the enterprise;
   classifying information associated with the collaborative entity according to the identified purpose;
   creating web-page templates for each combination of purpose and associated collaborative entity based on the classified information;
   deploying the web-page templates as collaborative information source templates, whereby the collaborative entity can publish information using the collaborative information source templates;
   analyzing the published information to generate profiles for the collaborative entity or persons associated with the enterprise; and
   enabling searching for an expert using the generated profiles.

2. The method of claim 1, wherein the collaborative entity corresponds to at least one of a person, a team, a project, an initiative, and a community.

3. The method of claim 1, further comprising:
   displaying hyperlink information on the web-page templates, the hyperlink information representing a link to additional information associated with the collaborative entity.

4. The method of claim 1, further comprising:
   assigning a privacy level to the published information, wherein the privacy level comprises one of a public privacy level open generally to users in the enterprise and a private privacy level closed to users not associated with the collaborative entity.

5. The method of claim 1, further comprising:
   enabling navigation between the expert and the published information associated with the expert.

6. The method of claim 1, further comprising:

enabling pushing of information to target users based on the generated profiles.

7. The method of claim 1, wherein the generated profiles include a skill set related to the associated collaborative entity or persons.

8. A system for publishing information associated with a collaborative entity within an enterprise, the system comprising:

a memory including a program that identifies at least one purpose for publishing information within the enterprise;

classifies information associated with the collaborative entity according to the identified purpose;

creates web-page templates for each combination of purpose and associated collaborative entity based on the classified information;

deploys the web-page templates as collaborative information source templates, whereby the collaborative entity can publish information using the collaborative information source templates;

analyzes the published information to generate profiles for the collaborative entity or persons associated with the enterprise; and enables searching for an expert using the generated profiles; and a processor that runs the program.

9. The system of claim 8, wherein the collaborative entity corresponds to at least one of a person, a team, a project, an initiative, and a community.

10. The system of claim 8, wherein the program further comprises:

displaying hyperlink information on the web-page templates, the hyperlink information representing a link to additional information associated with the collaborative entity.

11. The system of claim 8, wherein the program further comprises:

assigning a privacy level to the published information, wherein the privacy level comprises one of a public privacy level open generally to users in the enterprise and a private privacy level closed to users not associated with the collaborative entity.

12. The system of claim 8, wherein the program further comprises:

enabling navigation between the expert and the published information associated with the expert.

13. The system of claim 8, wherein the program further comprises:

enabling pushing of information to target users based on the generated profiles.

14. The system of claim 8, wherein the generated profiles include a skill set related to the associated collaborative entity or persons.

15. A computer program product including instructions for execution by a processor to perform a method for publishing information associated with a collaborative entity within an enterprise, the method comprising:

identifying at least one purpose for publishing information within the enterprise;

classifying information associated with the collaborative entity according to the identified purpose;

creating web-page templates for each combination of purpose and associated collaborative entity based on the classified information;

deploying the web-page templates as collaborative information source templates, whereby the collaborative entity can publish information using the collaborative information source templates;

analyzing the published information to generate profiles for the collaborative entity or persons associated with the enterprise; and enabling searching for an expert using the generated profiles.

16. The computer program product of claim 15, wherein the method further comprises:

enabling pushing of information to target users based on the generated profiles.

17. The computer program product of claim 15, wherein the generated profiles include a skill set related to the associated collaborative entity or persons.

* * * * *